US006850512B1

United States Patent
Bishop et al.

(10) Patent No.: US 6,850,512 B1
(45) Date of Patent: Feb. 1, 2005

(54) TWO TIER HI-SPEED WIRELESS COMMUNICATION LINK

(75) Inventors: R. Adrian Bishop, Melbourne, FL (US); Thomas E. Gorsuch, Indialantic, FL (US); John V. Page, Melbourne, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

(21) Appl. No.: 09/384,072

(22) Filed: Aug. 26, 1999

(51) Int. Cl.[7] .............................................. H04B 7/216
(52) U.S. Cl. ........................ 370/342; 370/338; 370/235; 455/450; 455/426.1
(58) Field of Search ................................ 370/342, 390, 370/352, 425, 465–466, 235–338, 401, 229, 230, 231, 469; 375/202; 455/450, 455, 464, 403, 575.1, 550.1, 408, 426.1

(56) References Cited

U.S. PATENT DOCUMENTS

| | | | | |
|---|---|---|---|---|
| 5,020,092 A | 5/1991 | Phillips et al. | ................. | 379/59 |
| 5,020,093 A | 5/1991 | Pireh | ............................ | 379/59 |

(List continued on next page.)

FOREIGN PATENT DOCUMENTS

| | | | | |
|---|---|---|---|---|
| EP | 0 663785 A2 | * 7/1995 | ............ | H04Q/7/24 |
| WO | WO 98/59523 | 12/1998 | | |
| WO | WO 99/22493 | 5/1999 | | |
| WO | WO 99/22493 A2 | * 5/1999 | ............ | H04L/12/28 |

OTHER PUBLICATIONS

Nowton's Telecom Dictionary, by Harry Newton, Telecom Books, Oct., 1998.*
Haartsen, J., "*Bluetooth—The Universal Radio Interface for AD HOC, Wireless Connectivity*" Ericsson Review, SE, Ericsson, Stockholm, No. 3, 1998, pp. 110–117, XP000783249.
"IEEE 802.11 Wireless LAN Standard," The MAC Layer, pp. 1–2, downloaded Jul. 15, 1999 from http://www.wlana.com/intro/standard/mac.html.
"IEEE 802.11 Technical Tutorial," pp. 1–18, downloaded from http://www.breezecom.com.
Melanchuk, et al., "CDPD and Emerging Digital Cellular Systems," XP000628458, pp. 2–8 (1996).

*Primary Examiner*—Edward F. Urban
*Assistant Examiner*—Charles Chow
(74) *Attorney, Agent, or Firm*—Hamilton, Brook, Smith & Reynolds, P.C.

(57) ABSTRACT

A system and method for communicating between a plurality of remote transceivers and a network is discussed including multiple types of serially-connected communication links, upon which data flows are established to communicate information between the remote transceivers and network. A hub is coupled to one end of a hardwired communication link while an access unit is coupled to the other end. In addition to supporting communications on the hardwired link, the hub supports communication with the plurality of remote transceivers over a wireless link of a first type. The access unit at the other end of the hardwired link is in further communication with a base station over a wireless communication link of a second type, while the base station is in further communication with the network. Based on this topology, data flows over this string of interconnected communication media support information transfers between the plurality of remote transceivers and the network.

23 Claims, 5 Drawing Sheets

U.S. PATENT DOCUMENTS

| | | | |
|---|---|---|---|
| 5,228,074 A | | 7/1993 | Mizikovsky ................. 379/59 |
| 5,276,703 A | * | 1/1994 | Budin et al. ................... 375/1 |
| 5,406,643 A | | 4/1995 | Burke et al. ................ 395/200 |
| 5,461,627 A | * | 10/1995 | Rypinski .................. 370/95.2 |
| 5,487,069 A | * | 1/1996 | Osullivan et al. .......... 370/94.3 |
| 5,504,803 A | | 4/1996 | Yamada et al. .............. 379/59 |
| 5,546,397 A | * | 8/1996 | Mahany .................... 370/85.1 |
| 5,636,217 A | * | 6/1997 | Moelard .................... 370/338 |
| 5,696,903 A | | 12/1997 | Mahany .................... 395/200 |
| 5,796,727 A | | 8/1998 | Harrison et al. ........... 370/338 |
| 5,815,811 A | | 9/1998 | Pinard et al. .............. 455/434 |
| 5,842,122 A | | 11/1998 | Schellinger et al. ........ 455/403 |
| 5,845,211 A | | 12/1998 | Roach, Jr. .................. 455/436 |
| 5,907,544 A | * | 5/1999 | Rypinski .................... 370/337 |
| 6,003,068 A | * | 12/1999 | Sopko ....................... 709/205 |
| 6,031,863 A | * | 2/2000 | Jusa et al. .................. 375/202 |
| 6,252,883 B1 | * | 6/2001 | Schweickart et al. ....... 370/441 |
| 6,314,286 B1 | * | 11/2001 | Zicker ....................... 455/431 |
| 6,330,244 B1 | * | 12/2001 | Swartz et al. ............... 370/401 |
| 6,411,632 B2 | * | 6/2002 | Lindgren et al. ........... 370/466 |
| 6,421,714 B1 | * | 7/2002 | Rai et al. ................... 709/217 |
| 2002/0089958 A1 | * | 7/2002 | Feder et al. ................ 370/338 |

* cited by examiner

TWO TIER HI-SPEED WIRELESS COMMUNICATION LINK

BACKGROUND OF THE INVENTION

The widespread availability of low-cost personal computers has enhanced the desire to relay tremendous volumes of information between parties in communication over networks such as the Internet. A similar demand exists for wireless communication technology such as voice-based cellular telephones due to the convenience afforded by mobile flexibility. It is not surprising, therefore, that there exists increasing demand for combined technology supporting high speed data transfers between interconnected computers over wireless communication links.

One fairly low-cost solution supporting wireless communication is to connect a computer to a modem and cellular phone to create a connection with an Internet service provider, thus, forming a wireless link between a client computer and a network such as the Internet. Unfortunately, this type of link has several drawbacks. In particular, such a link is often painstakingly slow due to the inefficiencies of combining the two technologies.

Part of the inefficiencies in mating wireless and network communications is due to their inherent architectures. For example, the protocols used for connecting computers over hardwired links do not easily lend themselves to efficient transmission over standard wireless links, which have been designed for voice grade communications requiring continuous but relatively slow data transfer rates.

Cellular networks were originally designed to provide voice grade communications, which typically require only a 3 Kilohertz bandwidth. Based on these techniques, the low frequency channels employed for voice communication are generally limited to a digital baud rate of 9.6 kilobits per second (kbps), which is slow compared to transfer rates such as 56.6 kbps that are now commonly available in inexpensive wire-line modems. Notably, the reception of a sophisticated web page at a client computer based on wireless voice grade channels is slow compared to the speed of a tethered modem connection to a hardwired telephone link. In short, it is similarly difficult to receive, or transfer for that matter, any large files over standard voice based telephone systems.

Based on the increased desire to communicate with networks in the wireless sense, the Institute of Electrical and Electronics Engineers (IEEE) has developed a standard for Wireless Local Areas Networks (WLANS) known as 802.11. This standard focuses on resolving compatibility issues between manufacturers of WLAN equipment. In short, it supports a single hub topology that provides wireless links to a plurality of users, connecting each of them to a network link such as 802.3 otherwise known as Ethernet. Based on this architecture, a plurality of computers are able to communicate with a network over a wireless link eventually coupled to a hardwired link. Unfortunately, the range of this wireless link with respect to the stationary hardwired link and hub is limited in range of up to 500 meters. Moreover, the standard is further restrictive because hub is typically in communication with a network over a tethered Ethernet link. On a positive note, however, the standard provides high speed data transfers over a plurality of short-range wireless communication links.

SUMMARY OF THE INVENTION

The cost associated with wireless communication services can be prohibitive. For example, individual users typically sign up for a fee-based wireless service entitling them to the use of a single wireless link. This single subscription to a wireless link in addition to being slow is expensive when the total service cost for multiple users is taken into consideration. The present invention focuses on solving the problem by providing appropriate relief. In particular, sporadic and short term high throughput needs of individual end-users are satisfied by the methods described herein at a total lower overall communication link cost.

One motivation of the present invention is to provide a method for supporting increased mobility of remote terminals in communication with a network without unduly reducing data throughput on any of the links. When a group of users share a communication link for network access, it is recognized that typically only a sporadic high-speed throughput capability is required by each user on a random basis. Hence, a single high speed data throughput media can be shared by multiple users to gain access to remote networks. Accordingly, the principles of the present invention are advantageously deployed to satisfy the combinational desire for higher speed throughput and increased wireless mobile flexibility.

It is an advancement in the art to provide a method for communicating between a plurality of remote terminals and a network, where the serial connection of multiple types of communication media supports both increased user mobility and high speed access of information. According to the principles of the present invention, a plurality of remote transceivers communicate with a hub over a first type of wireless communication link. The hub is coupled via a hardwired link to an access unit, which further supports data transfers to a base station over a second wireless communication link. This topology affords unique flexibility because it affords two-tiered mobility. Not only are the plurality of remote transceivers mobile with respect to the hub, likewise, the hub and access unit are potentially mobile or portable with respect to the base station. Notably, the methods of the present invention assure that high speed data transfer rates are not sacrificed in lieu of increased mobility.

In a preferred embodiment of the present invention, the first wireless link supports private non-fee based, short-range data flows between the plurality of remote transceivers and the hub. The second wireless link, in communication with the hub via a hardwired link, supports longer range communications such as data flows over a subscription-based link. Encryption techniques are optionally implemented on this link, and other links in the system for that matter, for increased security of communications.

Establishing the second wireless link includes making available a plurality of channels for use in data flows, where the channels utilized to create data flows on an as-needed basis. Typically, a data rate on any given channel is unable to support an acceptable transfer rate. Therefore, multiple available channels are simultaneously utilized to provide higher throughput data flows on the second wireless communication link. In the preferred embodiment, these channels are of the CDMA-type as used in typical cellular telephone communication links.

In the preferred embodiment, a protocol is employed at the physical layer level of the second wireless link to coordinate reformatting, partitioning, transmitting, receiving and reconstructing original packets, such as network messages. In short, the extra layer provides a method of repackaging data for transmission over the second wireless link. This extra package layer is than stripped at a receiver end of the second wireless link, resulting in the originally formatted data, which is further transmitted to a destination. Based on this technique, the plurality of remote transceivers and terminal equipment are seamlessly connected to a network at a remote location. Accordingly, remote users are afforded potentially the same high-speed data transfer rates as if the remote terminal equipment and transceivers were connected to a network via a hard-wired link such as a standard voice-based telephone line.

A WLAN, preferably a CSMA/CA or "listen-before-talk" scheme, is adopted for use on the first wireless communication link. This technique is used in IEEE 802.11 standard, which is one viable method for supporting data flows between the hub and plurality of transceivers. The use of an Ethernet, IEEE 802.3 standard, is also the preferred type of hardwired link, however, other viable links include designs based on token ring implementations or other star network topologies.

Data flows are preferably established based on a network message protocol such as TCP/IP. In this way, terminal equipment, such as computers or the like, running application network programs can easily interface to remote transceivers, which need only repackage data before transmission over the first communication link. On the receive end, the extra layer is stripped off, resulting in the originally formatted messages. This format is preferred because a common end network typically expects received data packets to be in the same format as originally transmitted over the network, i.e., data emanating from remote terminal equipment is in a network message format preferably understood by the destination node such as a server on the Internet.

Although one or many radio frequency channels are typically used to support communication on the first wireless communication link, it is optionally based on infrared. However, spread spectrum such as DSSS or FHSS around 2.4 GHz are preferably used in this typically shorter range wireless communication link. Other types of radio frequency implementations, such as those based on 1.9 GHz are also acceptable. For example, a protocol such as Blue Tooth (TM) or Home RF (TM) is optionally employed to support communication on the first link according to the principles of the present invention.

Also, it should be noted that communication between the plurality of remote transceivers or terminal equipment and network is bi-directional. For example, the same principles as previously discussed about data flows directed from the remote transceivers to the network apply equally, but in a reverse manner, to data flows directed from the network to the remote transceivers.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
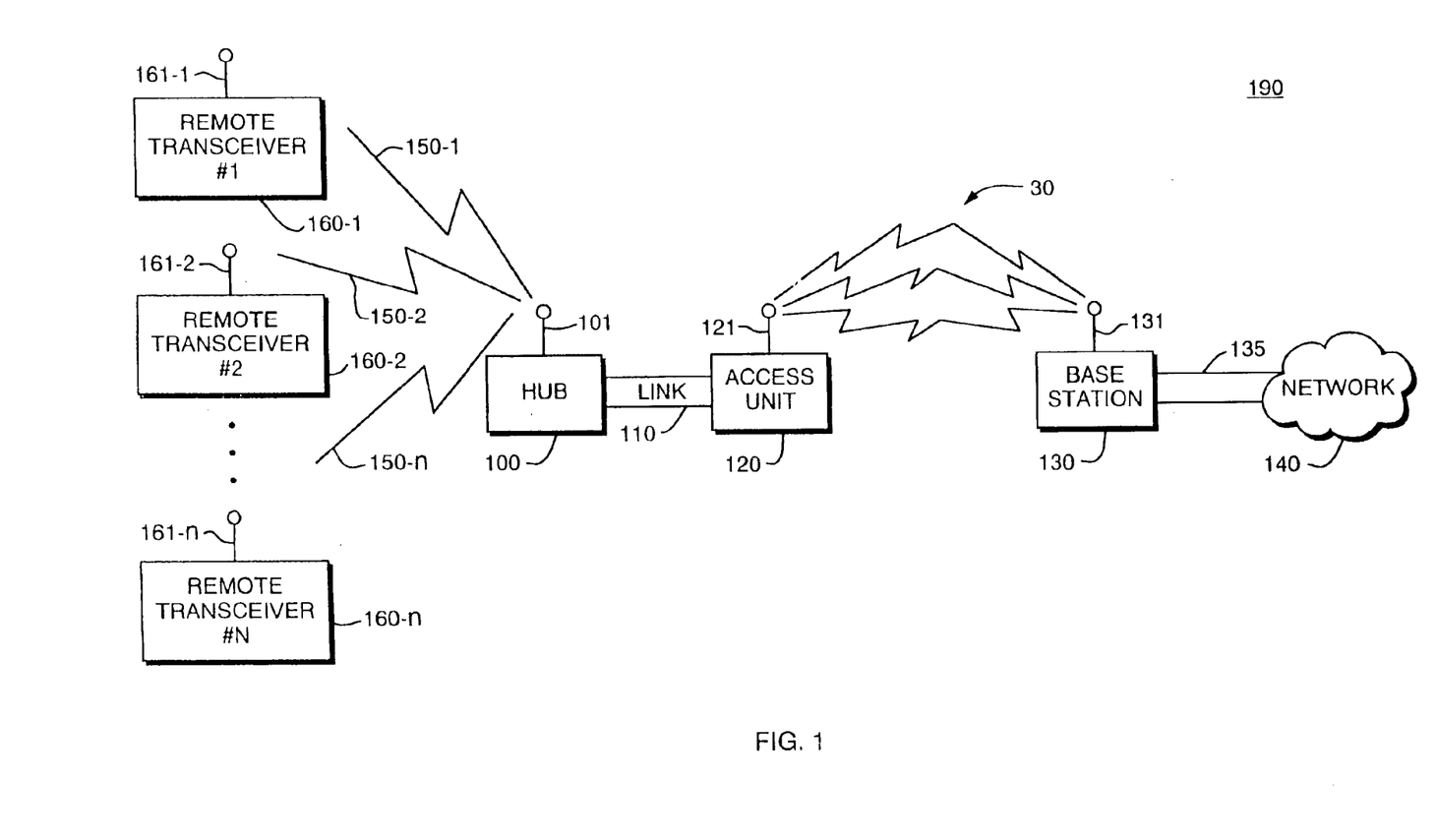
FIG. 1 illustrates the inventive two-tiered wireless communication system and related components.

FIG. 1 is a block diagram of a system for implementing high speed data communication over multiple media types according to the principles of the present invention. The system 190 includes a plurality of remote transceivers 160 in eventual communication with network 140.

Remote transceivers 160 typically connect to terminal equipment (not shown) such as a portable or laptop computer, a desktop computer, a Personal Digital Assistant (PDA), a 'wearable' computer or the like. Each remote transceiver 160 supports communication with hub 100 over a first type of wireless communication link 150. For example, information to be transferred from remote transceiver #1 160-1 is converted to a format suitable for transmission such as in accordance with known communication standards. In the preferred embodiment, terminal equipment coupled to each remote transceiver 160 transmits and receives data based on a TCP/IP or other standard network protocol. In particular, network messages from remote transceiver #1 160-1 are transmitted over a first type of wireless communication link 150-1 from antenna 161-1 to create a data flow to hub 100 where the data is received on antenna 101.

It should be noted that data flows are also supported in the reverse direction in a similar manner such that data at the hub 100 is transferred over link 150-1 to the remote transceivers 161.

Communication link 110 coupling the hub 100 to access unit 120 provides further support of data flows. This link 110 is, for example, an Ethernet type link based on IEEE 802.3 optionally comprising more than one physical wire.

The system described thus far, including the remote transceiver 160 and hub 101, is optionally based on IEEE 802.1, which is a standard for WLANs. The 802.11 standard provides access to channels based on an access method known as Carrier Sense Multiple Access with Collision Avoidance (CSMA/CA). In simple terms, this method is based on a "listen before talk" scheme. For example, a transceiver 160 must first monitor traffic on radio channel 150 to determine if another transceiver 160 is transmitting. If the radio channel 150 is clear, the transceiver 160 may transmit information or frame over the radio channel 150. Based on this CSMA/CA scheme, transmission of data from the same transmitter cannot occur before a minimum time gap. After the minimum time gap has passed, the station selects a random "backoff interval" which is the wait time before the radio channel 150 is then monitored to determine whether it is clear to transmit. If the channel is still busy, a shorter backoff interval is selected. This process is repeated until the transmitter is allowed to transmit data.

Network messages transmitted by remote transceivers typically include an extra protocol layer so that packets can be transmitted over the radio channel 150 and, thereafter, be processed by hub 100 upon receipt. Once received, the hub 100 strips off the extra layer to retrieve the original network messages for routing to access unit over Ethernet link 110. Likewise, network messages emanating from network 140 destined for one of the remote transceivers 160 are reformatted before transmission over first wireless communication link 150. As in the former mentioned implementation of data flows from a remote transceiver 160 to hub 100, an extra layer added by the hub 100 in the reverse direction is likewise stripped off by receiving remote transceiver 160.

The original network message(s) from hub 100 are then appropriately routed to coupled terminal equipment. In short, the extra layer is used to reformat network messages, facilitating the transmission of such data over physical link 30.

Further details of the aforementioned standard of transmitting data between the plurality of remote transceivers 160 and hub 100 can be found in IEEE 802.11, which is available from IEEE located in Princeton, N.J. Likewise, the IEEE 802.3 standard related to Ethernet communication and link 110 is also available from the IEEE.

It should be noted that the use of IEEE 802.11 compliant equipment is merely exemplary. Other wireless systems optionally support wireless communication among a plurality of transceivers 160 and hub 100. For example, wireless link 150 is optionally infrared or some other type of wireless communication link.

One desirable aspect of the first wireless link 150 is the ability to support higher speed data transfers. Based on the 802.11 standard as mentioned, DSSS for use with BPSK modulation provides a 1 Mega bit per second (MBPS) data rate, or QPSK provides a 2 MBPS data rate. Likewise, the standard supports FHSS with GFSK modulation and two hopping patterns providing data rates of 1 MBPS and 2 MPBS.

Another desirable aspect of the first wireless communication link 150 is its ability to support private non-fee based communications. For example, after an initial investment of hub 100 and remote transceiver equipment 160, no costs other than maintenance or upgrades are necessarily incurred by users for mere use of this part of the communication system 190.

To some extent, communication on hub 100 already provides a level of security against intruders because frequency hopping techniques are generally used to transmit data. Additionally, the system is optionally designed to include encryption of data so that data flows over the first communication link 150 are further protected from eavesdroppers trying to gain access to, for example, vital corporate communications.

The long-range second wireless link 30 preferably operates on a public fee-based service incorporating the use of cellular equipment such as a ground or satellite base station. Although there is typically a cost incurred for use of this link 30 in the system 190, such subscription costs are minimized because multiple channels are utilized simultaneously to support data flows. Hence, a single subscription supporting the use of many channels to provide high speed data flows is superior to the higher cost associated with a group of individuals each signing up for many slower speed single subscription-based links. These cost savings are beneficially passed on to the operators of the system, rendering it possible to provide communications among a mass of users at a lower overall cost.

An alternative method of providing high speed data flows between remote transceivers 160 and hub 100 is the Bluetooth (TM) baseband protocol, which relies on frequency hopping transceivers to combat interference and fading. Based on the Bluetooth (TM) baseband protocol, a combination of circuit and packet switching is deployed to support data transfer rates of up to 1 MBPS. The normal link range is 10 cm to 10 meters, but transmit power is optionally increased to provide links of up to 100 meters. More information regarding the Bluetooth (TM) baseband protocol and system topology can be found at web-site: http://www.bluetooth.net.

Another potential protocol for supporting communication on the first wireless link is based on Home RF (TM). More information regarding this protocol is available at web-site: http://www.homerf.org Regardless of the topology chosen for communication between hub 100 and remote transceivers 160, access unit 120 coupled to hub 100 via link 110 provides further support of data flows to and from network 140. Specifically, a second wireless communication link 30 between the access unit 120 and base station 130 affords high throughput of data traffic and mobility of the combined hub 100 and access unit 120. The allocation of multiple subchannels on the second wireless communication link 30 between access unit antenna 121 and base station antenna 131 increase throughput of the overall system many times over. Thus, throughput of the system does not suffer as a result of incorporating the second wireless communication link 30 as multiple channels or CDMA forward links simultaneously are utilized to create a high data throughput link.

The principles of the present invention, including the second wireless communication link 30 are advantageous over existing techniques. For example, the techniques of providing a high speed communication link between the access unit 120 and base station 130 in conjunction with the first wireless communication link 150 make it a unique two-tiered wireless system. Based on this topology, two-tier mobility is supported between a plurality of transceivers 160 in communication with network 140. A first tier allows remote transceiver 160 wireless mobile flexibility with respect to hub 100, while a second tier supports wireless mobile flexibility of combined hub 100 and access unit 120 with respect to base station 130. It should be noted that further tier can be added to support even further flexibility.

As mentioned, communication link 110 is preferably based on the IEEE 802.3 (Ethernet) standard for contention networks. In particular, the standard incorporates a bus or star topology and relies on Carrier Sense Multiple Access with Collision Detection capabilities (CSMA/CD) to regulate traffic on the link. Typically, this link is physically made of twisted pair wire, a coaxial or fiber optic cable supporting data flows of variable length data frames. Included with each frame or network packet are destination and control information for routing of packets to the appropriate location. Based on this protocol, data flows are supported between the hub 100 and access unit 120.

It should be noted that the use of an Ethernet link is merely exemplary and that other types of links optionally provide the same functionality. Most importantly, communication link 110 preferably supports high speed data flows from hub 100 to access unit 120. Additionally it is preferred that an Ethernet type link 100 is used in conjunction with an 802.11 hub 100 because the two are designed to be readily compatible for supporting network data communications. However, any suitable network device is optionally used such as other LAN devices. These include ring networks, other star networks, token bus networks, token pass networks, and token ring networks.

Figure 2:
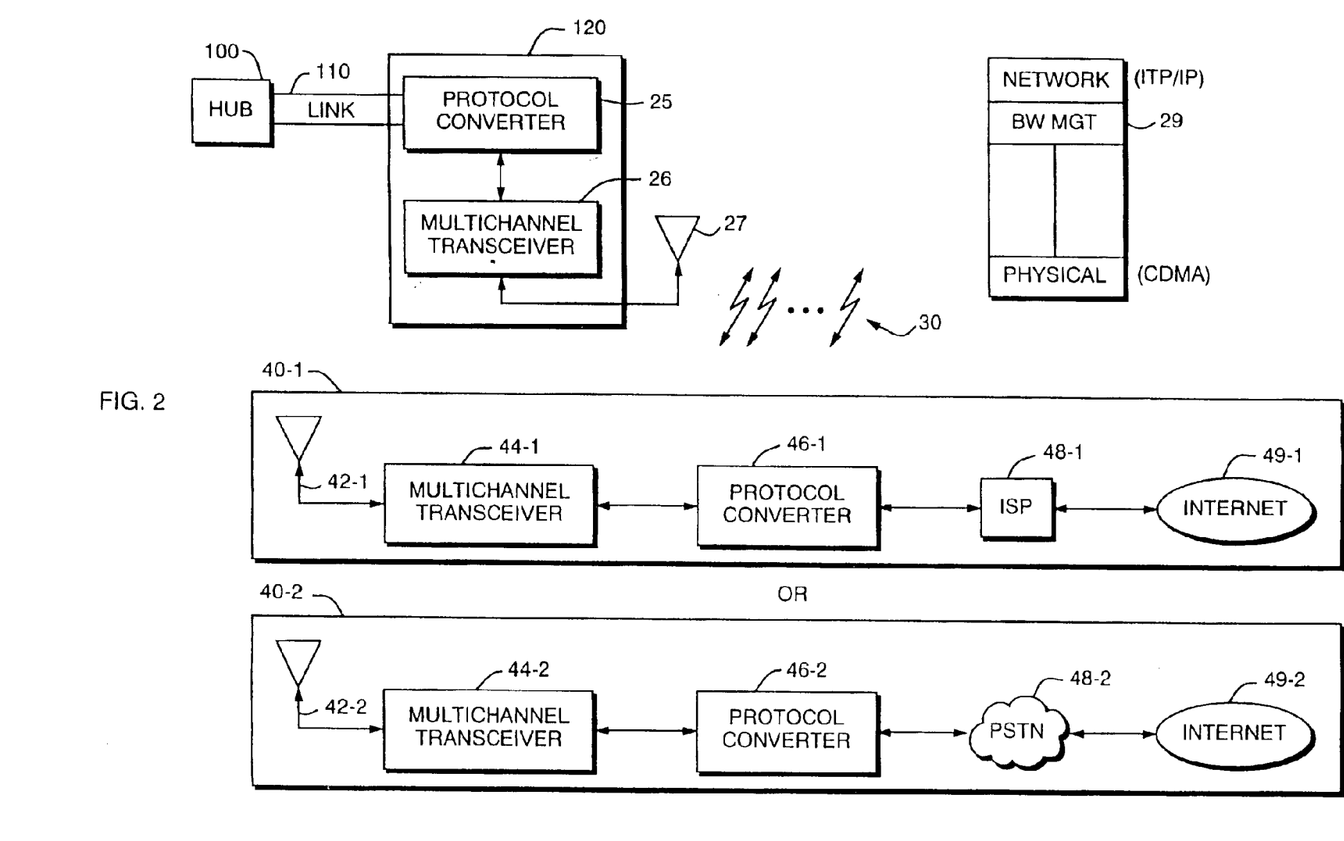
FIG. 2 provides further detail of the inventive two-tiered wireless communication system and related components.

Turning attention now to the details of the second wireless communication link, FIG. 2 shows greater detail of access unit 120, second wireless communication link 30 and other blocks in FIG. 1.

Referring to FIG. 2, the subscriber or access unit 120 is in communication with hub 100 via link 110. The hub 100 transmits data such as network messages to a protocol converter 25, which in turn provides data to a multichannel digital transceiver 26 and antenna 27.

Data flows on link 100 are preferably in a format suitable for transmission such as in accordance with known communication standards. For example, hub 100 may convert data signals from the remote transceivers 161 to a wireline physical layer protocol format such as specified by the Integrated Services Digital Network (ISDN) standard at rates of 128 kbps, or the Kflex standard at rates of 56.6 kbps. At a network layer, the data provided by the hub 100 is preferably formatted in a manner consistent with suitable network communication protocols such as TCP/IP to permit the remote transceivers 161 and terminal equipment to connect to other computers over networks such as the Internet. This description of the hub 100 and preferred protocol is exemplary only and it should be understood that other protocols are optionally used.

The protocol converter 25 implements an intermediate protocol layer suitable for converting the data provided by the hub 100 on link 110 to a format appropriate for the multichannel transceiver 26 according to the invention, and as will be described in much greater detail below.

The multichannel digital transceiver 26 provides access to one or more physical communication links such as the illustrated radio channels 30. The physical links are preferably known wireless communication air interfaces using digital modulation techniques such as Code Division Multiple Access (CDMA) standard specified by IS-95. It should be understood that other wireless communication protocols and other types of links 30 may also be used advantageously in the invention.

The channels 30 represent one or more relatively slower communication channels, such as those operating at a 9.6 kbps rate typical of voice grade communication. These communications channels may be provided by a single wide bandwidth CDMA carrier such as having a 1.25 MegaHertz bandwidth, and then providing the individual channels with unique orthogonal CDMA codes. Alternatively, the multiple channels 30 are based on single channel communication media such as provided by other wireless communication protocols. However, what is important is that the net effect is that the channels 30 represent multiple communication channels that may be adversely effected by significant bit error rates that are unique to each link 30.

An "error" as described herein is a bit error perceived at the higher layer such as the network layer. The invention only strives to improve the system level bit error rate, and does not attempt to guarantee absolute data integrity.

At the local level, the service provider equipment 40 may for example be implemented at a wireless Internet Service Provider (ISP) 40-1. In this case, the equipment includes an antenna 42-1, a multichannel transceiver 44-1, a protocol converter 46-1, and other equipment 48-1 such as modems, interfaces, routers, and the like which are needed for the ISP to provide connections to the Internet 49-1.

According to the ISP implementation as in 40-1, the multichannel transceiver 44-1 provides functions analogous to the multichannel transceiver 26 of the subscriber unit, but in an inverse fashion. The same is true of the protocol converter 46-1, that is, it provides inverse functionality to the protocol converter 25 in the subscriber unit 120. The ISP 40-1 accepts data from the protocol converter 46-1 in the TCP/IP frame format and then communicates such data to the Internet 49-1. It should be understood that the configuration of the remaining ISP equipment 48-1 may take any number of forms such as a local area networks, multiple dial up connections, T1 carrier connection equipment, or other high speed communication links to the Internet 49-1.

The service provider 40 optionally includes a radio base station in a cellular telephone system or wireless local loop (WLL), permitting a dial-up connection between the remote transceivers 160 and server 49-2. In this instance, the base station 40-2 includes an antenna 42-2, multichannel transceiver 44-2, and protocol converter 46-2 providing one or more connections to a public switched telephone network (PSTN) 48-2, and ultimately to the server 49-2.

In addition to the illustrated implementations 40-1 and 40-2, there may be various other ways of implementing the provider 40 in order to provide a connection to data processing equipment from the terminal equipment coupled to remote transceivers 160.

Turning attention now to the functions of the protocol converters 25 and 46, they can be thought of as intermediate layer within the context of the Open System Interconnect (OSI) model for communication. In particular, the protocol converter provides a bandwidth management functionality 29 implemented between a physical layer such as provided by the CDMA protocol in use with the multichannel transceivers 26 and a network layer protocol such as TCP/IP providing connections between the terminal equipment 22 and the Internet 49-1 or server 49-2.

The bandwidth management functionality 29 preferably provides a number of functions in order to keep both the physical layer and network layer connections properly maintained over multiple communication links 30. For example, certain physical layer connections may expect to receive a continuous stream of synchronous data bits regardless of whether terminal equipment at either end actually has data to transmit. Such functions may also include rate adaption, bonding of multiple channels on the links, spoofing, radio channel setup and takedown.

The present invention is more particularly concerned with the technique used by the protocol converters 25 and 46 for adjusting the frame size of individual channels used over each of the multiple links 30 in order to improve the effective throughput rate between a sender and a receiver in a bit error rate prone environment. It should be understood in the following discussion that the connections discussed herein are bidirectional, and that a sender may either be the subscriber or access unit 120 or the provider unit 40.

Figure 3:
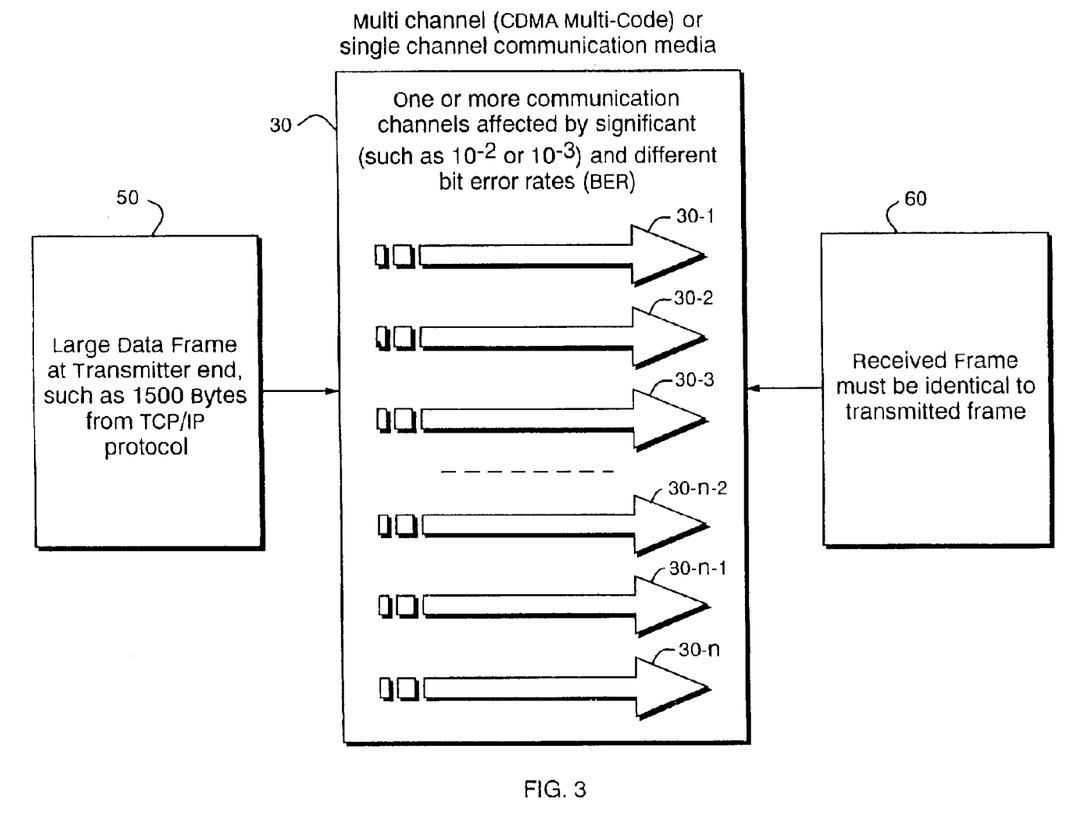
FIG. 3 is a diagram depicting how network layer data frames are divided among multiple physical links or channels.

More specifically, the problem addressed by the present invention is shown in FIG. 3. A frame 60 as received at the receiver end must be identical to the frame 50 originating at the sender. This is despite the fact that multiple channels are used with much higher bit error rates with the received frame 60 being transmitted reliably with a bit error rate of $10^{-6}$ or better as is typically required in TCP/IP or other network layer protocols. The present invention optimizes the effective data throughput such that the received frames 60 are not affected by the experienced bit error rate performance of network layer connections.

It should be understood that another assumption is that the individual channels 30-1, 30-2 . . . 30-N may experience different bit error rate levels both over time and in an average sense. Although each of the channels 30 may operate quite similarly, given the statistical nature of errors, identical behavior of all of the channels 30 is not assumed. For example, a specific channel 30-3 may receive severe interference from another connection in a neighboring cell, and be capable of providing only a $10^{-3}$ whereby other channels 30 may experience very little interference.

In order to optimize the throughput for the system 10 on a global basis, the invention also preferably optimizes the parameters of each channel 30 separately. Otherwise, a relatively good channel 30-1 might suffer down speed procedures required to accommodate a weaker channel 30-3.

It should also be understood that the number of channels 30 necessary to carry a single data stream such as a rate of 128 kbps at a given point in time can be relatively large. For example, up to 20 channels 30 are assigned at a particular time in order to accommodate a desired data transfer rate. Therefore, the probability of different characteristics in any given one of the channels 30 is significantly different.

Figure 4:
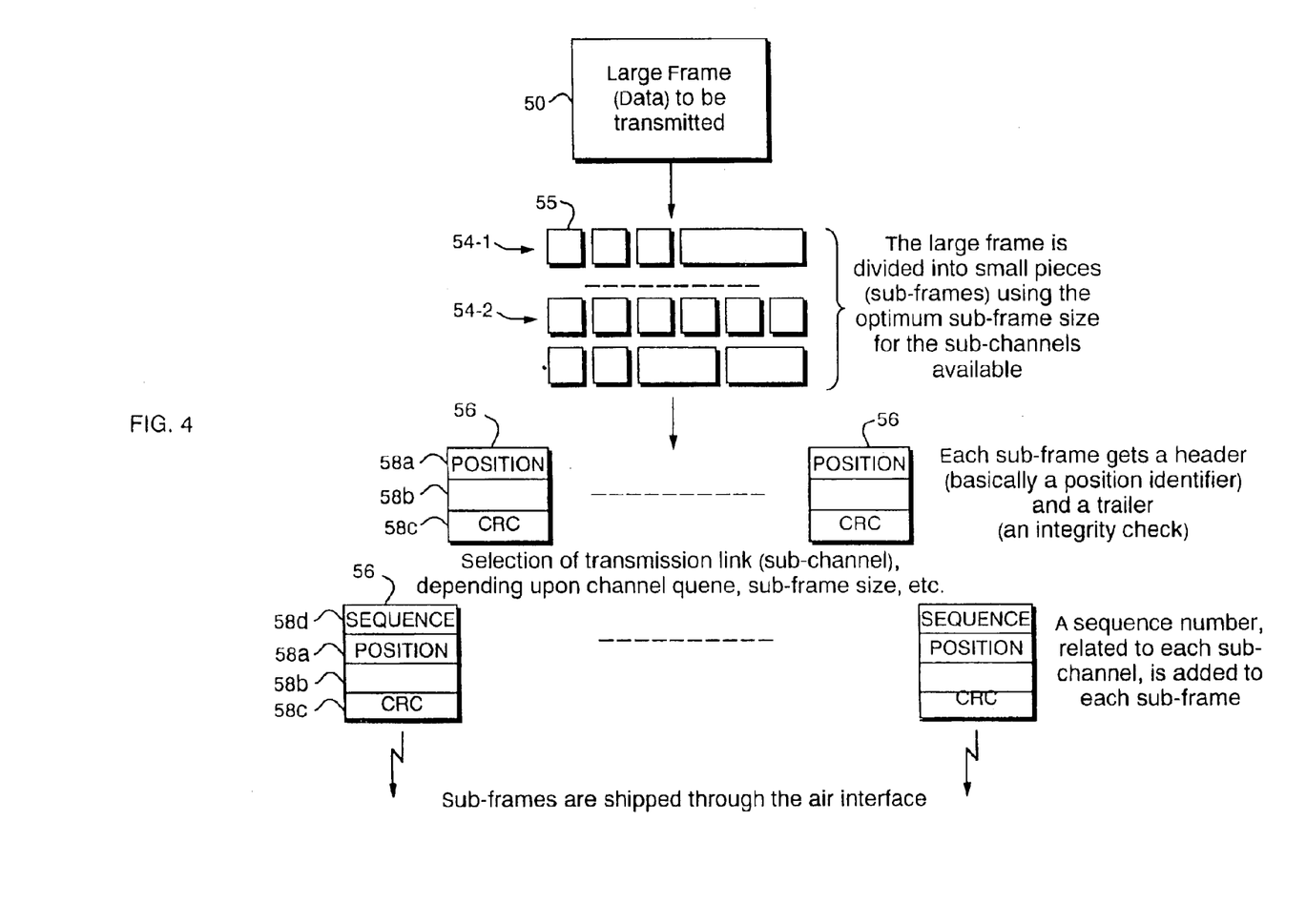
FIG. 4 is a more detailed diagram showing how network layer frames are divided into subframes by a protocol converter located at a sending unit.

Turning attention now more particularly to FIG. 4, the operations of the protocol converter 25 or 46 at the sender will be more particularly described. As shown, the input frame 50 as received from the network layer is relatively large, such as for example 1480 bits long, in the case of a TCP/IP frame.

The input frame 50 is first divided into a set of smaller pieces 54-1, 54-2. The size of the individual pieces 54 are chosen based upon the optimum subframe size for each of the channels 30 available. For example a bandwidth management function may make only a certain number of channels 30 available at any time. A subset of the available channels 30 is selected, and then the optimum number of bits for each subframe intended to be transmitted over respective one of the channels is then chosen. Thus as illustrated in the FIG. 4, a given frame 54-1 can be divided into pieces associated with four channels. At a later time, there may be nine channels 30 available for a frame, with different optimum subframe sizes for the peice 54-2.

Each of the subframes 56 consists of a position identifier 58*a*, a data portion 58*b*, and a trailer typically in the form of an integrity checksum such as a cyclic redundancy check (CRC) 58*c*. The position identifier 58*a* for each subframe indicates the position within the associated larger frame 50.

The subframes 56 are then further prepared for transmission on each channel 30. This may be done by adding a sequence number related to each channel at the beginning of each subframe 56. The subframe 56 is then transmitted over the associated channel 30.

Figure 5:
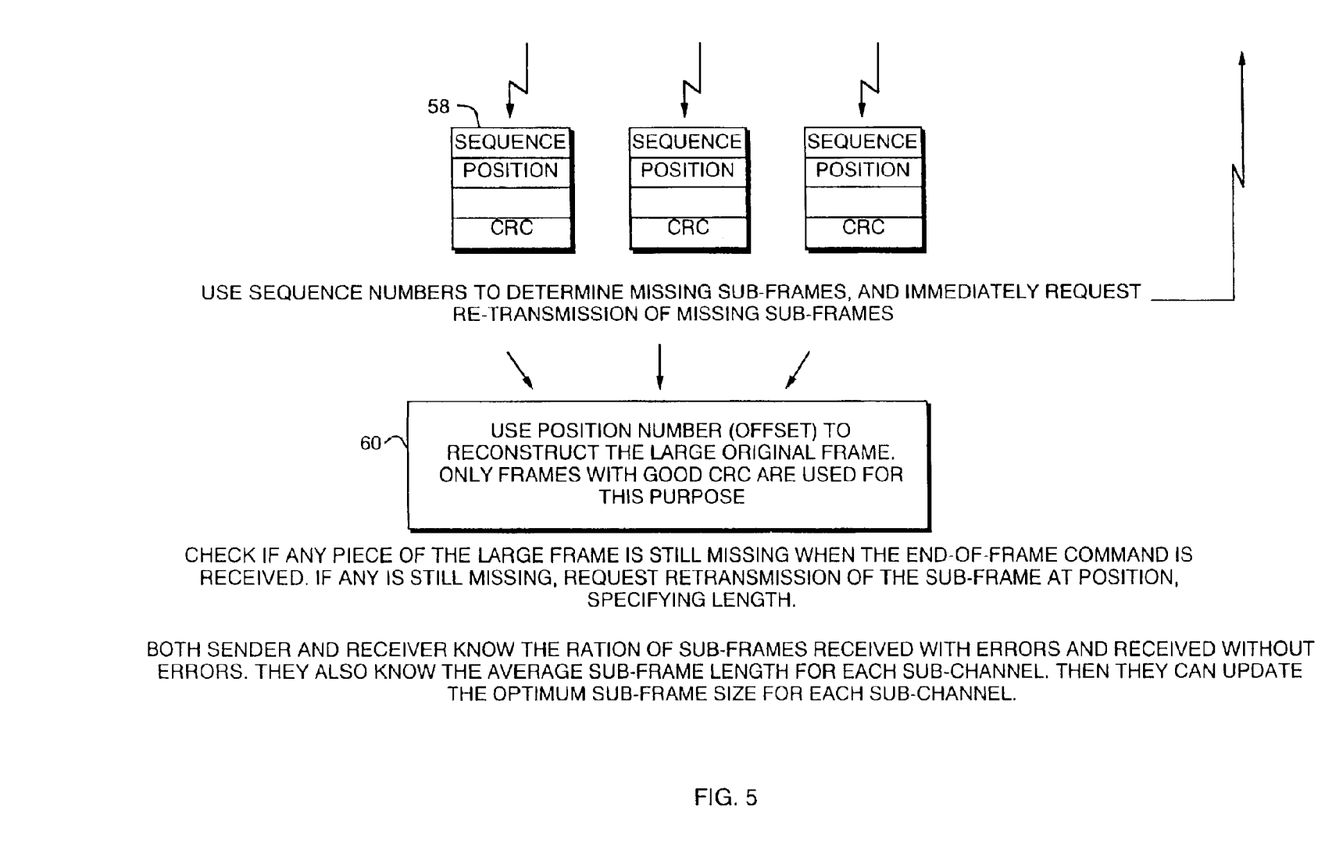
FIG. 5 is a continuation of the diagram of FIG. 4.

FIG. 5 illustrates the operations performed at the receive side. The subframes 56 are first received on the individual channels 30. A subframe 56 is discarded as received if the CRC portion 58*c* is not correct.

The sequence numbers 58*d* of the remaining frames 56 are then stripped off and used to determine whether any subframes 56 are missing. Missing subframes 56 can be detected by comparing the received sequence numbers 58*d*. If a sequence number is missing, it is assumed that the associated subframe 56 was not received properly. It should be understood that appropriate buffering of data and subframes 56 is typically required in order to properly receive the subframes 56 and determine if there are any missing sequence numbers depending upon the transmission rates, number of channels 30 and propagation delays in effect.

Upon the detection of a missing subframe 56, retransmission of the missed subframe is requested by the receiving end. At this point, the transmitting end reperforms transmission of the missing subframe.

Once all of the subframes 56 are received, the position number 58*a* is then used to arrange the data from the subframes 56 in the proper order to construct the output received frame 60.

At this point, also, if any piece of the large output frame 60 is still missing, such as when an end of frame command is encountered, retransmission of the corresponding subframe can also be requested at the indicated position, specifying a length for the missing piece.

Because of the use of both the position and sequence numbers, the sender and receiver know the ratio of the number of subframes received with errors to the number of frames received without errors. Also, the receiver and sender know the average subframe length for each channel. The optimum subframe size can thus be determined for each channel from these parameters as will be described more fully below.

One example of where the principles of the present invention as shown in FIG. 1 are particularly useful is a remote site such as a trade show. It has been increasingly prevalent that sales people at trade shows rely heavily on computers to convey information to customers through tutorials and demonstrations. In many cases, information must be accessed from a remote location and retrieved on demand at a trade show site. Hence, there is an immediate need for each salesperson to have access to a hi-speed network connection.

One method to provide network access for salespeople is to supply them with a direct hardwired network link. The use of such a link has several drawbacks. Renting the use of a hardwired link from trade show facilities is often very expensive due to monopolistic tendencies of the facility owners. Admittedly however, such links can be tedious and therefore costly to maintain in this ever-changing environment. Typically, there are no viable alternatives for allowing patrons to establish high speed communication links with remote networks, other than through these hardwired links supplied by the trade show facility.

Even if a hardwired link is available at a reasonable rate, the hard-wired links are usually restrictive because computers connected to such links are tethered to a cable, preventing mobility of the operator. Needless to say, it is sometimes important that a salesperson approach the customer to make a sale.

For example, a potential customer may quickly lose interest in a booth and related products if they have to stand in line to speak with a salesperson, perhaps to the point that they also do not leave a business card. If properly noted, salespeople can be dispatched on down times to ultimately track down potential customers who showed an interest in their booth but were too busy to provide adequate attention at the time. Accordingly, a salesperson could optionally "hunt" the entire trade show floor with a computer at his side and, if needed, retrieve volumes of data available on demand over a hi speed network interface such as communication system 190. Hence, for these and other reasons, there is strong desire to operate communicate with a network on a wireless basis because of the mobile flexibility that it affords. Alternative methods of establishing a link, such as individual connections via a modem and cellular telephone link, provide only low speed data transfers such as 14.4 KBPS.

In addition to increased mobility, combined hub 100 and access unit 120 makes it possible for a trade show participant to provide their own lower cost wireless connection to a base station 130 in further communication with a network 140. Additionally, the low reliability of haphazardly laid network cables no longer negatively impacts sales at the show due to cable failures.

The principles of the present invention are also advantageously deployed at large multi-corporate meetings, where participants using laptop computers require access to either the Internet or their own network and data bases. A group of corporate representatives attending an off-site meeting from a single corporation can advantageously supply their own computer network connections by locating combined hub 100 and access unit 130 in an immediate off-site corporate location to be supported. For example, business executives can access limitless information at the remote location. A computer in wireless range of the hub is free to access almost limitless information over the communication system in a location such as a boardroom or, alternatively, other locations in a building because the first wireless communication link 150 is operable through walls and the like. This topology also provides security because it is essentially private. Communications directed over ones own network, such as E-mail or the like, are therefore secure from intrusion.

It should be noted that there are many other possible applications of the present invention and that the use of the previously described applications are merely exemplary for pointing out some of its advantageous features.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for communication of data between a plurality of remote transceivers and a network based on data flows over multiple types of communication links disposed therebetween, the method comprising the steps of:

establishing a first set of wireless communication links between the plurality of remote transceivers and a hub for transmission of data messages from terminal equipment coupled to the plurality of remote transceivers;

transmitting the data messages from at least one of the plurality of remote transceivers to the hub;

receiving the data messages at the hub;

routing data messages received by the hub over a hardwired link to a subscriber unit;

aggregating data messages from multiple individual logical data flows generated by computers coupled to the plurality of remote transceivers;

establishing a second wireless communication link between the subscriber unit and base station using multiple shared radio channels, whereby the aggregated data messages from multiple logical data flows are reformatted to include an extra physical layer for transmission of data on said second wireless communication link;

stripping the extra physical layer from the data messages received over the second wireless communication link at the base station and reconstructing data messages to an original form; and routing the data messages in the original form to a network in communication with the base station.

2. A method as described in claim 1 further comprising the step of:

making available a plurality of subchannels within the second wireless communication link for establishing data flows, wherein a data transfer rate on each subchannel is typically less than the nominal data transfer rate of any data flow.

3. A method as described in claim 2 further comprising the step of:

allocating available subchannels on an as-needed basis over the second wireless communication link to provide data transfers over two or more subchannels for higher speed transfers of at least one data flow between a remote transceiver and the network.

4. A method as described in claim 1 wherein the hub is based on an IEEE 802.11 standard.

5. A method as described in claim 1 wherein the hardwired communication link between the hub and the access unit is based on an IEEE 802.3 standard.

6. A method as described in claim 1 wherein the second wireless communication link supports multiple individual high speed data transfers for each of the remote transceivers.

7. A method as described in claim 1 wherein the first wireless communication link is also a long-range wireless communication link.

8. A method as described in claim 1 wherein the second wireless communication link is also a high speed wireless communication link.

9. A method as described in claim 1 wherein the remote transceivers are operably linked to remote computer terminals in communication with the network.

10. A method as described in claim 1 wherein communication between the hub and the remote transceiver is based on spread spectrum.

11. A method as described in claim 1 wherein the first wireless communication link is FHSS around 2.4 Gigahertz and each remote transceiver communicates with the hub over a unique channel.

12. A method as described in claim 1 wherein the first wireless communication link is DSSS around 2.4 Gigahertz and each remote transceiver communicates with the hub over a unique channel.

13. A method as described in claim 1 wherein the first wireless communication link is based on infrared.

14. A method as described in claim 1 wherein the network is an Internet.

15. A method as described in claim 1 wherein the at least one wired communication link includes at least one Ethernet link.

16. A method as described in claim 1 wherein the second type of wireless communication link is based on a radio frequency near 1.9 Gigahertz.

17. A method as described in claim 1 wherein the second type of wireless communication link has a cellular range of greater than 1 mile.

18. A method as described in claim 1 wherein communication between the plurality of users and the hub is based on a wireless local area network (WLAN).

19. A method as described in claim 1 wherein communication of data messages to at least one of the plurality of transceivers is established in an inverse corresponding order.

20. A method as in claim 1, wherein the hardwired link is part of a contention network.

21. A method as in claim 1, wherein peer-to-peer connectivity is supported between servers coupled to the network and computers coupled to the remote transceivers.

22. A method as in claim 1 further comprising:

at the base station, receiving aggregated data flow information transmitted over the subscription-based wireless link; and processing the aggregated data flow information into data messages; and routing the data messages through the network.

23. A method as in claim 1, wherein a combination of the hub and subscriber unit is portable.

* * * * *